United States Patent
Sekine et al.

[11] Patent Number: 5,797,594
[45] Date of Patent: Aug. 25, 1998

[54] HYDRAULIC SHOCK ABSORBER

[75] Inventors: Chigaya Sekine; Hiromi Machida, both of Kanagawa-ken, Japan

[73] Assignee: Tokico, Ltd., Kawasaki, Japan

[21] Appl. No.: 683,419

[22] Filed: Jul. 18, 1996

[30] Foreign Application Priority Data

| Jul. 22, 1995 | [JP] | Japan | 7-207785 |
| Sep. 13, 1995 | [JP] | Japan | 7-260709 |
| Feb. 15, 1996 | [JP] | Japan | 8-055265 |
| Apr. 11, 1996 | [JP] | Japan | 8-114104 |

[51] Int. Cl.$^6$ .................. B60G 17/00; F16F 9/14
[52] U.S. Cl. .......... 267/64.17; 188/315; 280/707
[58] Field of Search ............... 188/315, 282, 188/299, 322.14, 284, 285; 280/707, 714; 267/64.17, 64.26

[56] References Cited

U.S. PATENT DOCUMENTS

| 3,559,776 | 2/1971 | Schultze | 188/315 X |
| 4,577,840 | 3/1986 | Meller et al. | 267/64.17 |
| 4,635,765 | 1/1987 | Schmidt | 188/299 |
| 4,682,675 | 7/1987 | Eddy, Jr. | 188/299 |
| 4,832,162 | 5/1989 | Bacardit | 188/282 X |
| 5,351,790 | 10/1994 | Machida | 188/299 X |
| 5,386,893 | 2/1995 | Feigel | 188/315 X |
| 5,464,079 | 11/1995 | Lohberg et al. | 188/322.14 X |
| 5,467,852 | 11/1995 | De Kock | 188/315 X |
| 5,566,794 | 10/1996 | Wiard | 188/318 |
| 5,647,580 | 7/1997 | Buma | 267/64.17 |

FOREIGN PATENT DOCUMENTS

| 1 908 156 | 8/1970 | Germany . |
| 2 252 782 | 5/1974 | Germany . |
| 33 16 069 | 11/1984 | Germany . |
| 34 14 8321 | 11/1984 | Germany . |
| 3414821 C 2 | 11/1984 | Germany . |
| 34 19 166 C 1 | 12/1985 | Germany . |
| 36 30 757 | 3/1988 | Germany . |
| 195 29 389 A 1 | 2/1997 | Germany . |
| 57-0192643 | 11/1982 | Japan | 188/315 |
| 2191263 | 12/1987 | United Kingdom | 188/315 |

Primary Examiner—Robert J. Oberleitner
Assistant Examiner—Pamela J. Lipka
Attorney, Agent, or Firm—Wenderoth, Lind & Ponack, L.L.P.

[57] ABSTRACT

A hydraulic shock absorber has a case that includes an oil chamber, a cylinder and a reservoir chamber inside the case. A piston connected to a piston rod is fitted into the cylinder. A pump rod is fitted into a pump tube located inside the piston rod for forming a pump chamber. The pump chamber is communicated with an oil chamber through an oil passage and with a cylinder upper chamber through another oil passage. The motion of the pump rod caused by extension and retraction of the piston rod allows oil to flow from the oil chamber to the pump chamber and then to the cylinder upper chamber for extending the piston rod. When a vehicle height is increased to a normal height, cut-outs formed in the pump rod serve to communicate the pump chamber with the cylinder upper chamber for stopping the extension of the piston rod. When it becomes higher than the normal height, an orifice passage serves to relieve oil of the cylinder upper chamber to the oil chamber for lowering the vehicle height.

20 Claims, 10 Drawing Sheets

Fig. 10
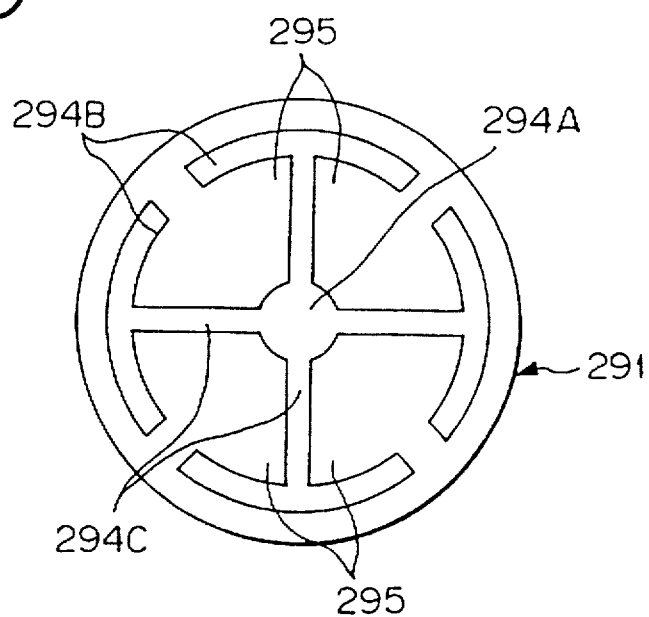
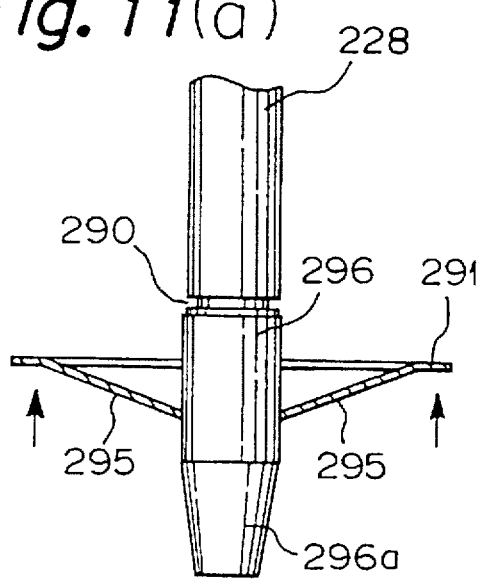
Fig. 11(a)
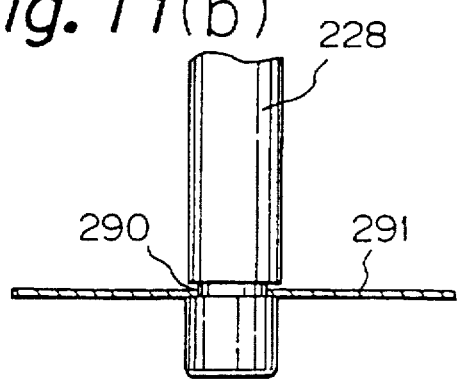
Fig. 11(b)

HYDRAULIC SHOCK ABSORBER

BACKGROUND OF THE INVENTION

1. Field of the Invention

The present invention relates to a hydraulic shock absorber having a function of automatically adjusting a height of a vehicle. The shock absorber is mounted to a suspension system of a vehicle such as a car.

2. Description of the Related Art

In general, for improving riding comfortability and steering stability, a vehicle such as a car is constructed to mount a hydraulic shock absorber between a sprung mass and an unsprung mass of a suspension system. The shock absorber serves to attenuate vibrations of a suspension spring.

As to a vehicle with a relatively large payload such as a van, a vehicle height is often changed as a result of the change of a live load caused when passengers get on or off or baggage is loaded or unloaded. The change of the vehicle height may make the riding comfortability and the steering stability lower. To overcome this unfavorable condition, a suspension system has been expected for automatically keeping a constant vehicle height irrespective of the amount of a live load.

As such a suspension system, as described in the Japanese Patent Laid Open No. Sho 60-261713, a so-called self-pumping type shock absorber has been proposed which includes an oil tank and a reservoir containing high-pressure gas sealed therein, a pump for feeding oil from the oil tank to a cylinder by virtue of the motion of a piston rod, a relief unit for relieving pressured oil in the pump and the cylinder to the oil tank according to the location of the piston rod. This self-pumping type shock absorber activates the pump with the vibrations of a suspension system caused when the car is running so that the piston rod is adjusted to keep its extended length constant, thereby automatically keeping the car height constant.

In hydraulic shock absorbers of another kind, a damper valve, like a shutter, is provided in an oil passage of a piston in the cylinder. The valve serves to change an oil passage section for properly adjusting the damping force according to some conditions such as a road condition and a running condition. The proper adjustment of the damping force enhances the riding comfortability and the steering stability of the car.

The foregoing self-pumping type shock absorber, however, is constructed to have a dual-cylinder structure composed of an inner cylinder and an outer cylinder around the inner cylinder. It also has an oil tank and a reservoir located between the inner cylinder and the outer cylinder. This construction results in reducing the gas volume of the oil tank and the reservoir. The small gas volume leads to a large gas reaction, even to a small amount of piston rod stroke, if the live load is large. This worsens the riding comfortability. To enlarge the gas volume, the outer cylinder may be made to have a larger diameter. The outer cylinder having a larger diameter needs a large mounting space on a vehicle, which disadvantageously results in remarkably lowering the the ability to mount the shock absorber in a vehicle.

Further, the foregoing self-pumping type shock absorber employs a so-called inverted structure where the piston rod is projected from a lower end of the cylinder. Therefore, if the shock absorber is used as a suspension strut, the shock absorber is made to be costly and have a complicated structure and a large sliding resistance.

Moreover, the self-pumping type shock absorber as noted above is constructed to have a pump and a relief unit in the piston inside of the cylinder. The relatively large area of the piston is occupied by the pump and the relief unit. In fact, therefore, it is quite difficult to situate the damping valve in the piston.

In a sliding portion between the cylinder and the piston, heat is developed more remarkably than the rest of the structure. The conventional system contains gas located between the inner cylinder and the outer cylinder. This sliding portion, therefore, has a disadvantage in that thermal conduction is made worse.

SUMMARY OF THE INVENTION

In order to overcome the foregoing disadvantages, according to an aspect of the invention, a shock absorber includes; a cylinder containing oil sealed therein, a case located around the cylinder so as to form a reservoir chamber with the cylinder and a piston slidably fitted in the cylinder so that the piston divides the interior of the cylinder into two chambers. A hollow piston rod has one end connected to the piston and the other end extended outside through a guide member for closing one end of the case and the cylinder. An oil passage allows oil to be communicated between the interior of the cylinder and the reservoir chamber. A base member closes the other ends of the cylinder and the case. A pump rod has one end connected to the base member and the other end extends into the piston so that it is slidably fitted in a pump tube located in a hollow portion of the piston rod for forming a pump chamber in the pump tube. A first pump passage is located to extend through the pump rod from the one end to the other end. A cylindrical oil tank is connected to one end of the first pump passage and has a partition for dividing the interior of the oil tank into an oil chamber for reserving the oil and a gas chamber containing gas sealed therein. A first check valve is located in the first pump passage for communicating the oil chamber of the oil tank with the pump chamber and allowing only flow of the oil from the oil chamber to the pump chamber. A second pump passage is located in the piston rod for communicating the pump chamber with the interior of the cylinder. A second check valve allows only flow of the oil from the pump chamber to the cylinder in the second pump passage. A first passage means is located between the pump tube the pump rod and for directly communicating the pump chamber with the inside of the cylinder when the piston rod is extended to a first predetermined location determined by a relative location between the pump tube and the pump rod. A second passage means communicates the interior of the cylinder with the first pump passage when the piston rod is extended to a second predetermined location.

In this construction, with the motion of the piston rod, the pump rod travels to and fro inside the pump tube so that the oil contained in the oil chamber is guided to the pump chamber through the first pump passage and the first check valve. At the same time, the oil in the pump chamber is fed to the cylinder chamber through the second check valve and the second pump passage so that the oil pressure in the cylinder is enhanced, and thus the piston rod is extended. When the piston rod is extended to the first predetermined location, the first passage serves to communicate the pump chamber with the cylinder chamber so that the boosting of the oil pressure inside of the cylinder chamber is stopped. When the piston rod is extended to the second predetermined location, the second passage serves to communicate the cylinder chamber with the first pump passage so that the oil pressure inside the cylinder chamber is relieved to the oil chamber, thereby reducing the pressure inside the cylinder and retracting the piston rod.

BRIEF DESCRIPTION OF THE DRAWINGS

FIG. 10 is a plan view showing a form of a disk forming a connecting means provided in the shock absorber according to the fourth embodiment of the present invention;

FIGS. 11 are front views showing a method of mounting a disk to a pump rod in the shock absorber according to the fourth embodiment of the present invention and also showing the assembled state of these components.

DETAILED DESCRIPTION OF THE PREFERRED EMBODIMENTS

Figure 1:
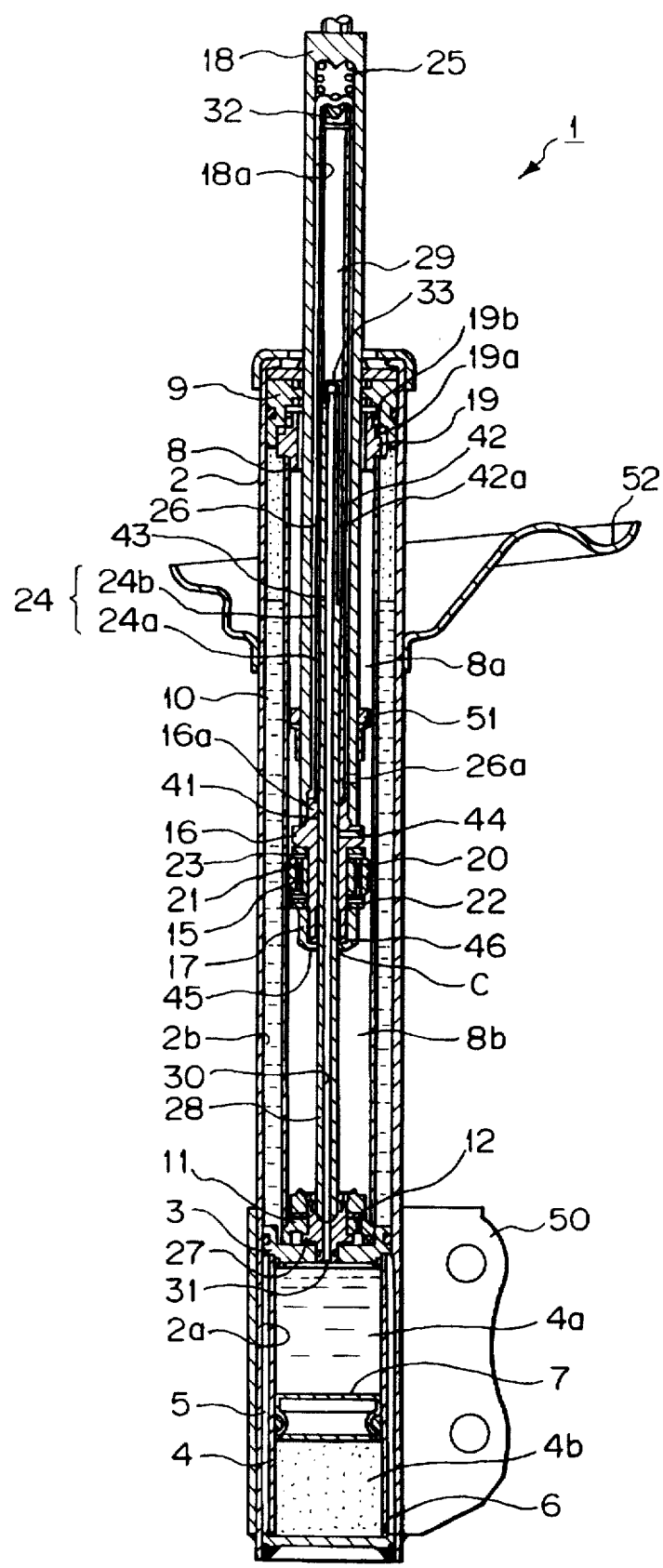
FIG. 1 is a longitudinal section showing a hydraulic shock absorber according to a first embodiment of the present invention.

The embodiments of the present invention will be described in detail with reference to the drawings.

At first, description will be made in connection with a hydraulic shock absorber according to a first embodiment of the present invention with reference to FIGS. 1 to 5. As shown, a shock absorber 1 includes a partition member 3 fitted into a case 2, the lower end of which is closed and the upper end of which is opened. This partition member 3 divides the interior of the case 2 into a bottom side chamber 2a and an open side chamber 2b.

The bottom side chamber 2a contains a cylinder member 4 inserted therein. The cylinder member 4 has a slightly smaller diameter than the case 2. Numeral 5 denotes an annular chamber formed between the case 2 and the cylinder member 4. The annular chamber 5 is communicated with the cylinder member 4 through a passage 6 located in the lower end of the cylinder member 4. The cylinder member 4 contains a free piston 7 slidably fitted therein. The free piston 7 divides the interior of the cylinder member 4 into an oil chamber 4a located on the side of the partition member 3 and a gas chamber 4b communicated with the annular chamber 5 through the passage 6. The oil chamber 4a contains oil sealed therein. The gas chamber 4b and the annular chamber 5 contain gas (2 to 6 kg/cm$^2$) sealed therein.

The open side chamber 2b contains a cylinder 8 inserted therein. The cylinder 8 has a slightly smaller diameter than the case. Numeral 9 denotes a sealing member mounted on an opening of the case 2 so as to form an annular reservoir chamber 10 between the case 2 and the cylinder 8. A base valve 11 is mounted on the partition side end of the cylinder 8. The base valve 11 provides an oil passage 12 for communicating the interior of the cylinder 8 with the reservoir chamber 10. The base valve 11 has a check valve 13 (see FIG. 3) for allowing only flow of the oil from the reservoir chamber 10 through the oil passage 12 to the interior of the cylinder 8 and an orifice 14 for always allowing passage of the oil through the oil passage 12. The cylinder 8 contains the oil sealed therein. The reservoir chamber 10 contains the oil and the high-pressure gas (15 to 35 kg/cm$^2$) sealed therein.

An annular piston 15 is slidably fitted into the cylinder 8. The piston 15 serves to divide the interior of the cylinder 8 into a cylinder upper chamber 8a on the opening side of the case 2 and a cylinder lower chamber 8b communicated with the reservoir chamber 10 through the base valve 11. A generally cylindrical piston bolt 16 is inserted through the piston. The tip of the piston bolt has a piston nut 17 screwed thereon for fixing the piston. The piston bolt 16 has a screw portion on the base end. Around the screw portion 16a is screwed one end of a piston rod 18 having a hollow portion 18a therein. The other end of the piston rod 18 extends through the sealing member 9 and a rod guide 19 fitted to the upper end of the cylinder 8 and then is extended to the outside of the case 2 and the cylinder 8. The rod guide 19 provides a passage 19a for communicating the cylinder upper chamber 8a with the reservoir chamber 10 and a check valve 19b for regulating the flow of the oil and the gas through the passage 19a (see FIG. 4). The check valve 19b operates to discharge to the reservoir chamber 10 the gas entrained into the cylinder 8 when the piston rod 18 is in the expanding stroke and to block the flow of the gas of the reservoir chamber 10 into the cylinder 8 when the piston rod 18 is in the compressing stroke.

Figure 2:
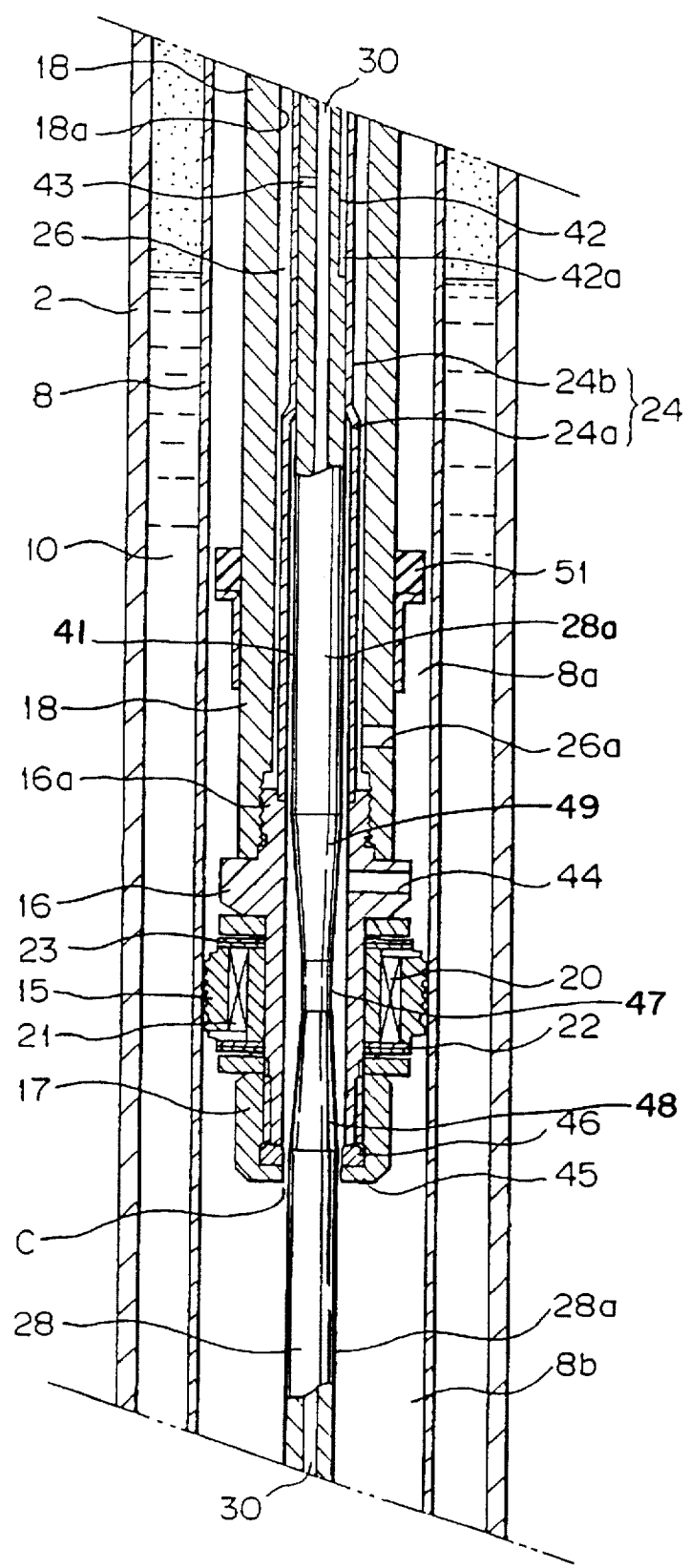
FIG. 2 is an expanded view showing an essential portion of the shock absorber shown in FIG. 1.

As shown in FIG. 2, the piston 15 provides an expanding side passage 20 and a contracting side passage 21 for communicating the cylinder upper chamber 8a with the cylinder lower chamber 8b. The piston 15 provides two normally closed disk valves 22 and 23. The disk valve 22 is flexed by the predetermined pressure applied from the cylinder upper chamber 8a so that the valve is opened for allowing flow of the oil through the expanding side passage 20 and thereby generating damping force. The disk valve 23 is flexed by the predetermined pressure applied from the cylinder lower chamber 8b so that the valve is opened for allowing flow of the oil through the contracting side passage 21 and thereby generating damping force.

The piston rod 18 contains a stepped pump tube 24 inserted therein. The stepped pump tube 24 has a large diameter portion 24a that is slightly smaller than that of the hollow portion 18a and a small diameter portion 24b. The pump tube 24 is fixed to the piston rod 18 by such an arrangement that the end of the small diameter portion 24b is pressed by a retainer spring 25 located on the bottom of the hollow portion 18a. The end of the large diameter portion 24a comes into contact with the piston bolt 16. Between the hollow portion 18a and the pump tube 24 is formed an annular oil passage 26. The annular oil passage 26 is communicated with the cylinder upper chamber 8a through a passage 26a located in the side wall of the piston rod 18. The oil passage 26 and the passage 26a compose a second pump passage.

Figure 3:
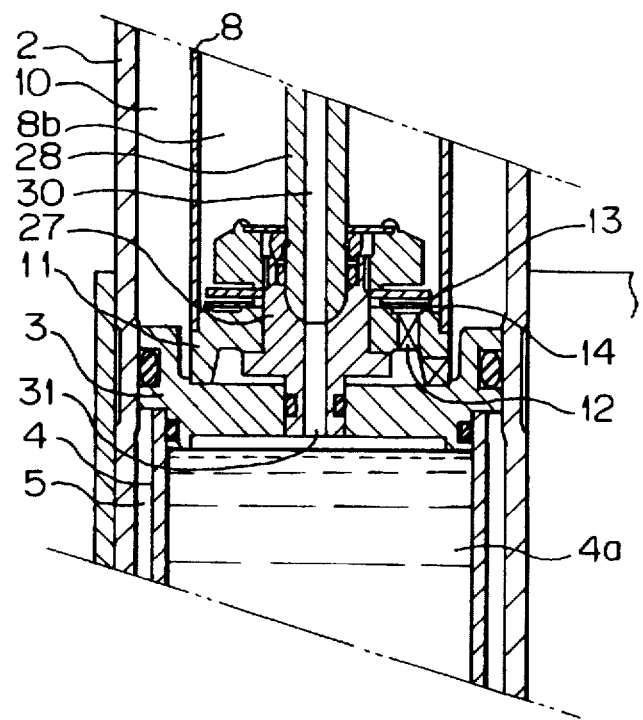
FIG. 3 is an expanded view showing a base valve of the shock absorber shown in FIG. 1.

As shown in FIG. 3, the partition member 3 and the base valve 11 are connected to a base end of a tubular pump rod 28 through a retainer 27. The connecting portion between the pump rod 28 and the retainer 27 is spherical so that both are allowed to be slid relative to each other. The sliding operation accepts the inclination of the pump rod 28 caused by the action of the shock absorber 1, thereby absorbing the locational offset. As shown in FIG. 2, the tip end portion of the pump rod 28 is extended along a center axis of the cylinder so that the pump rod 28 penetrates through the piston bolt 16 (piston 15). The pump rod 28 is further passed through the large diameter portion 24a of the pump tube 24 so that the pump rod 28 is slidably fitted into the small diameter portion 24b. The tip of the pump rod 28 serves to form a pump chamber 29 (see FIG. 4) in the small diameter portion 24b. An oil passage 30 is formed in the pump rod 28. Another passage 31 is formed in the retainer 27. The oil passage 30 and the passage 31 compose a first pump passage for communicating the pump chamber 29 with the oil chamber 4a. The small diameter portion 24b of the pump tube 24 provides a check valve 32 (see FIG. 5) at its end. The check valve 32 allows only the flow of oil from the pump chamber 29 to the oil passage 26. The pump rod 28 provides a check valve 33 at its end. The check valve 33 allows only flow of oil from the oil chamber 4a through the oil passage 30 to the pump chamber 29.

Figure 5:
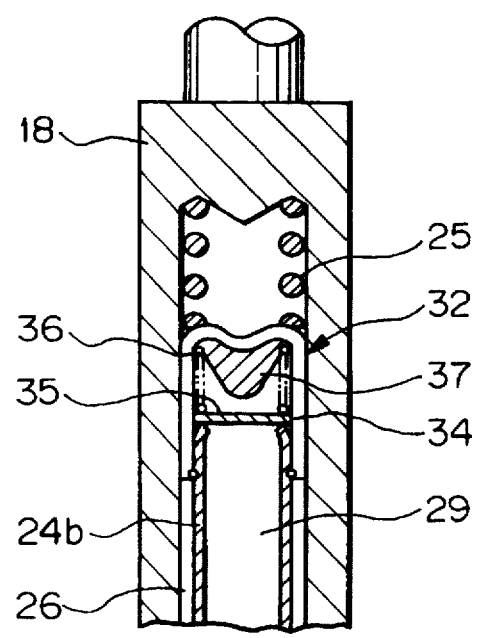
FIG. 5 is an expanded view showing a check valve of a pump tube of the shock absorber shown in FIG. 1.

As shown in FIG. 5, the check valve 32 is constructed so as to have a generally U-shaped retainer 34 fixed at the tip of the small diameter portion 24b of the pump tube 24, a valve body 35 to be seated on or separated from the opening of the small diameter portion 24b, and a valve spring 36 inserted between the valve body 35 and the retainer 34. When the check valve 32 is closed, the valve body 35 is pressed against the opening of the small diameter portion 24b by the pressure applied from the side of the oil passage 26. When the check valve 32 is opened, the valve body 35 is pushed upward from the opening of the small diameter portion 24b against the force of the valve spring 36 by the pressure applied from the side of the pump chamber 29. In addition, numeral 37 denotes a stopper for restricting the motion of the valve body 35.

Figure 4:
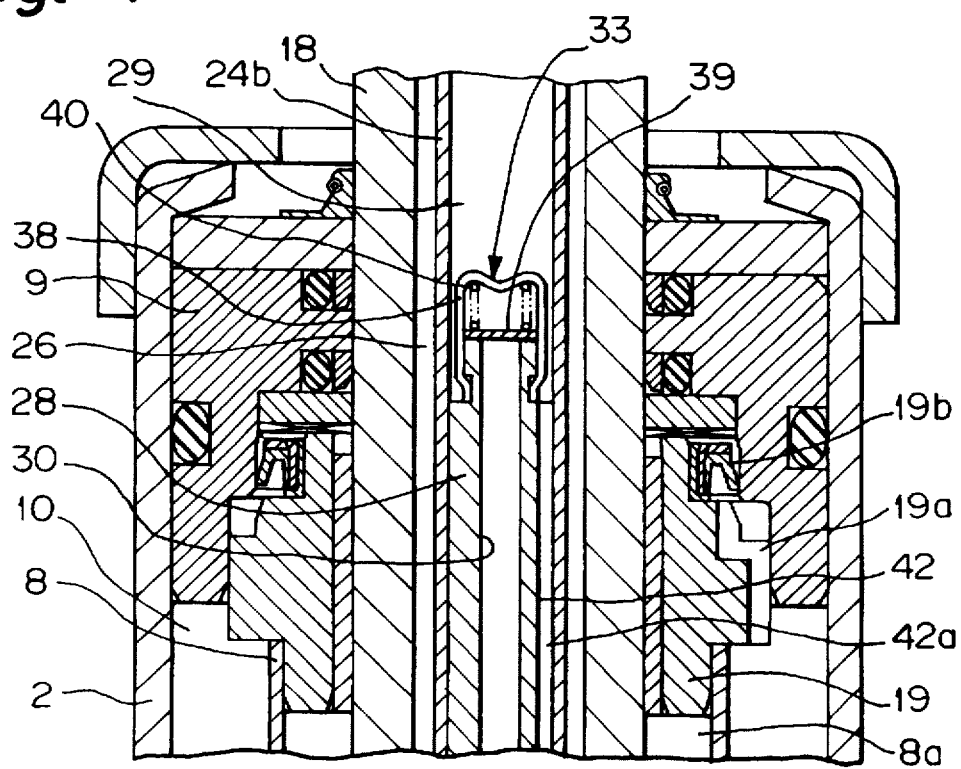
FIG. 4 is an expanded view showing an opening side end of a case and a cylinder and a check valve of a pump rod provided in the shock absorber shown in FIG. 1.

In turn, as shown in FIG. 4, the check valve 33 is constructed to have a generally U-shaped retainer 38 fitted at the tip of the pump rod 28, a valve body 39 to be seated on or separated from the opening of the tip of the pump rod 28, and a valve spring inserted between the valve body 39 and the retainer 38. When the check valve 33 is closed, the valve body 39 is pushed against the opening of the pump rod 28 by the pressure applied from the side of the pump chamber 29. When the check valve 33 is opened, the valve body 39 is pushed upward from the opening of the pump rod 28 against the force of the valve spring 40 by the pressure applied from the side of the oil passage 30.

Numeral 41 denotes an annular passage, which is defined by the piston bolt 16, the large diameter portion 24a of the pump tube 24 and the pump rod 28. The annular passage 41 is communicated with the cylinder lower chamber 8b. The pump rod 28 has a cut-out 42 formed to axially extend from the tip of the pump rod 28 fitted to the pump tube 24 up to a predetermined location. This cut-out 42 is served to form a gap 42a between the pump rod 28 and the small diameter portion of the pump tube 24. The gap 42a and the annular passage 41 composes a first passage means. If the extended length of the piston rod 18 is shorter than a predetermined normal range (a first predetermined location corresponding to a lower limit of the normal range), the cut-out 42 is overlapped with only the small diameter portion 24b of the pump tube 24. That is, the cut-out 42 does not reach the large diameter portion 24a of the pump tube 24. At this location of cut-out 42, the communication between the gap 42a and the annular passage 41 is cut off. When the piston rod 18 is extended to the predetermined normal range (the first predetermined location corresponding to the lower limit of the normal range), the pump tube 24 is moved together with the piston rod 18, so that the large diameter portion 24a is overlapped with the cut-out 42 and the gap 42a is communicated with the annular passage 41 and thereby with the cylinder upper and lower chambers 8a and 8b.

On the side wall of the pump rod 28 is formed an orifice passage 43 connected with the oil passage 30. The orifice passage 43 and the annular passage 41 compose the second passage. The orifice passage 43 is located closer to the pump chamber 29 rather than the end of the cut-out 42 on the side of the oil chamber 4a (the lower end as viewed in FIG. 4). When the extended length of the piston rod 18 is equal to or lower than a predetermined normal range (a second predetermined location corresponding to an upper limit of the normal range), the orifice passage 43 is overlapped with the small diameter portion 24b of the pump tube 24, so that the communication between the orifice passage 43 and the annular passage 41 is cut off. When the extended length of the piston rod 18 exceeds the predetermined normal range (the second predetermined location corresponding to an upper limit of the normal range), the orifice passage 43 is overlapped with the large diameter 24a of the pump tube 24, so that the orifice passage 43 is communicated with the annular passage 41 and thereby with the cylinder upper and lower chambers 8a and 8b.

In the side wall of the piston bolt 16 is formed a passage 44 communicating with the cylinder upper chamber 8a. The annular passage 41 formed between the piston bolt 16 and the pump rod 28 and the passage 44 compose an oil passage for communicating the cylinder upper chamber 8a with the cylinder lower chamber 8b. And, a flange 45 is located on the inner side of one end of the piston nut 17 fitted to the tip of the piston bolt 16. Between this flange 45 and the tip of the piston bolt 16 is formed an annular groove to which an annular sealing member 46 is fitted. Then, between this sealing member 46 and the pump rod 28 is formed an annular gap C, which serves to adjust an area of a passage between the cylinder upper chamber 8a and the cylinder lower chamber 8b. The sealing member 46 is fitted to the annular groove with a small clearance in both radial and axial directions. The sealing member 46 serves to prevent deformation of the piston nut 17 when it is fastened to the piston bolt and absorb oscillation of the piston rod 28 during operation of the shock absorber.

The pump rod 28 has a small diameter portion 47 at the portion facing the sealing member 46 when the extended length of the piston rod 18 stays in the predetermined normal range. The small diameter portion 47 has tapered portions 48 and 49 on both sides. The tapered portions are progressively increased in diameter so that those portions reach the large diameter portion 28a. When the extended length of the piston rod 18 is shorter or longer than the predetermined normal range, the tapered portion 48 or 49 is moved to the location facing the sealing member 46 so that the annular gap C is progressively reduced in size. When the extended or retracted location of the piston rod 18 is close to a stroke end, the large diameter portion 28a of the pump rod 28 is adjacent the sealing member 46 with a slight gap so that the large diameter portion 28a almost closes the annular gap C.

In order to mount the shock absorber 1 to the suspension system of a vehicle, the tip of the piston rod 18 is connected to the vehicle body side (not shown) and a bracket 50 fitted to the lower end of the case 2 is connected to the wheel side (not shown). Numeral 51 denotes a rebound stopper. Numeral 52 denotes a spring bracket for receiving a suspension spring (not shown).

The description will be directed to the function of the shock absorber of the first embodiment constructed as described above.

The description will be directed to the function of adjusting a vehicle height, which is provided by the shock absorber 1. When a vehicle has no load (keeps its normal height), the same pressure is applied to the gas chamber 4b located in the bottom side chamber 2a and the reservoir chamber 10 when the extended length of the piston rod 18 stays in the predetermined normal range. In this state, the cut-out 42 in the pump rod 28 is overlapped with the large diameter portion 24a of the pump tube 24 so that the pump chamber 29 is communicated with the cylinder upper and lower chambers 8a and 8b through the gap 42a and the annular passage 41. Therefore, the pumping action does not take place.

When the load is increased to lower the vehicle body below the normal vehicle height thereby reducing the extended length of the piston rod 18 below the normal range, the cut-out 42 of the pump rod 28 is closed by the small diameter portion 24b of the pump tube 24. In this state, if the vibrations of the suspension system appearing when the vehicle is running make the piston rod 18 extended, in the expansion process, the pump rod 28 travels back through the small diameter portion 24b of the pump tube 24, so that pressure applied inside of the pump chamber 29 is made lower, thereby causing the check valve 33 to be opened. The check valve 33 is opened so that the oil inside of the oil chamber 4a is introduced to the pump chamber 29 through the oil passage 30. In the compression stroke, the pump rod 28 advances to compress the interior of the pump chamber 29 to open the check valve 32 so that the oil is passed through the oil passage 26 and the passage 26a and then reaches the cylinder upper chamber 8a. The oil serves to apply the pressure to the cylinder upper and lower chambers 8a and 8b for extending the piston rod 18. In this operation, the vehicle height is increased by repeating the pumping operation with the vibrations appearing when the vehicle is running. Then, when the vehicle height reaches the normal vehicle height and the extended length of the piston rod reaches the normal range (the first predetermined location), the cut-out 42 of the pump rod 28 is overlapped with the large diameter portion 24a of the pump tube 24 so that the pump chamber 29 is communicated with the cylinder upper and lower chambers 8a and 8b. Hence, the pumping operation is ceased.

When the reduction of the live load of the vehicle makes the vehicle height greater than the normal height and the extended length of the piston rod 18 is made longer than the normal range (the second predetermined location), the cutout 42 of the pump rod 28 and the orifice passage 43 are overlapped with the large diameter portion of the pump tube 24 so that the pump chamber 29 is communicated with the cylinder upper and lower chambers 8a and 8b, thereby allowing the pumping operation to be ceased. At the same time, the cylinder upper and lower chambers 8a and 8b are communicated with the oil passage 30 through the annular passage 41 and the orifice passage 43, so that the oil contained inside of the cylinder upper and lower chambers 8a and 8b is relieved to the oil chamber 4a. As a result, the pressure of the chambers 8a and 8b and the reservoir chamber 10 is reduced and thereby the vehicle height is lowered. When the vehicle height is lowered to the normal height and the extended length of the piston rod 18 reaches the normal range, the orifice passage 43 of the pump rod 28 is overlapped with the small diameter portion 24 of the pump tube 24, so that the orifice passage 43 is closed, and thus, the relief of the oil contained in the chambers 8a and 8b is stopped.

As set forth above, by repeating the pumping and the relief operations with the vibrations of the suspension system caused when the vehicle is running, it is possible to keep the vehicle height constant independently of the amount of the live load in the vehicle.

Next, the description will be directed to the function of adjusting the damping force provided by the shock absorber 1. With the extension and the retraction of the piston rod 18, the oil is communicated between the cylinder upper and lower chambers 8a and 8b through the passage 44 and the annular passage 41 of the piston bolt 16, and the annular gap C formed between the pump rod 28 and the sealing member 46 serves to restrict the area of the flow path, thereby generating a damping force.

At the normal vehicle height, the extended length of the piston rod 18 stays in the normal range, and thus, the small diameter portion 47 of the pump rod 28 faces the sealing member 46 so that the area of the flow path of the annular gap C is made larger, thereby reducing the damping force (soft characteristic). When the vehicle height exceeds the normal height, that is, it is vertically displaced, the extended length of the piston rod 18 departs from the normal range so that the sealing member 46 faces the tapered portion 48 or 49 of the pump rod 28. As a result, the area of the flow path of the annular gap C is progressively diminished and thereby the damping force is made larger (medium characteristic). And, when the extended length of the piston rod 18 is close to the end of the stroke, the large diameter portion 28a of the pump rod 28 faces the sealing member 46, so that the annular gap C is almost closed, thereby increasing the damping force to a maximum (hard characteristic).

As mentioned above, with the stroke of the piston rod 18, the damping force may be varied. When the vehicle is running in a normal mode, that is, the vehicle height is close to the normal height, the damping is switched to the soft characteristic in which a rider can enjoy a comfortable ride. If the posture change of the vehicle caused in braking or turning makes the vehicle height greater than the normal height, the damping force is progressively made larger for restricting the posture change of the vehicle and thereby improving the steering stability. When the piston rod is close to the end of the stroke, the damping is switched to the hard characteristic in which bottoming may be prevented.

When the speed of the piston is increased and the pressure of the cylinder upper or lower chambers 8a or 8b reaches a predetermined value, in the extension stroke, the disk valve 22 is opened so that the oil flows through the oil passage 20 on the extension side, thereby causing the damping force to be generated. In the compression stroke, the disk valve 23 is opened so that the oil flows through the passage 21 on the compression side, thereby causing the damping force to be generated. This serves to restrain the excessive rise of the damping resulting from the fluid passing through the gap C.

The change of the volume of the cylinder 8 caused by the extension and retraction of the piston rod 18 is compensated as well. This compensation is carried out by communicating the oil between the cylinder lower chamber 8b and the reservoir chamber 10 through the oil passage 12 of the base valve 11 and the check valve 13 or the orifice 14 for compressing or expanding the gas inside of the reservoir chamber 10.

In the foregoing embodiment, by forming the small diameter portion 47 and the tapered portions 48 and 49 on the pump rod 28, the flow area of the annular gap C is allowed to be changed. Other arrangements may be adopted if the sectional area of the pump rod 28 for forming the annular gap C changes along its axial location. In this case, the flow area of the annular passage C may be changed with the stroke of the piston rod 18.

The bottom side chamber 2a (oil tank) for storing the oil for adjusting the vehicle height is located below the cylinder 8 inside of the case 2. Hence, the shock absorber 1 may provide a sufficiently large gas volume for the reservoir chamber 10 and the bottom side chamber 2a. The shock absorber 1 takes the so-called erected structure in which the piston rod 18 is projected from the top of the cylinder 8. This shock absorber 1 may preferably be used as a suspension strut.

Figure 6:
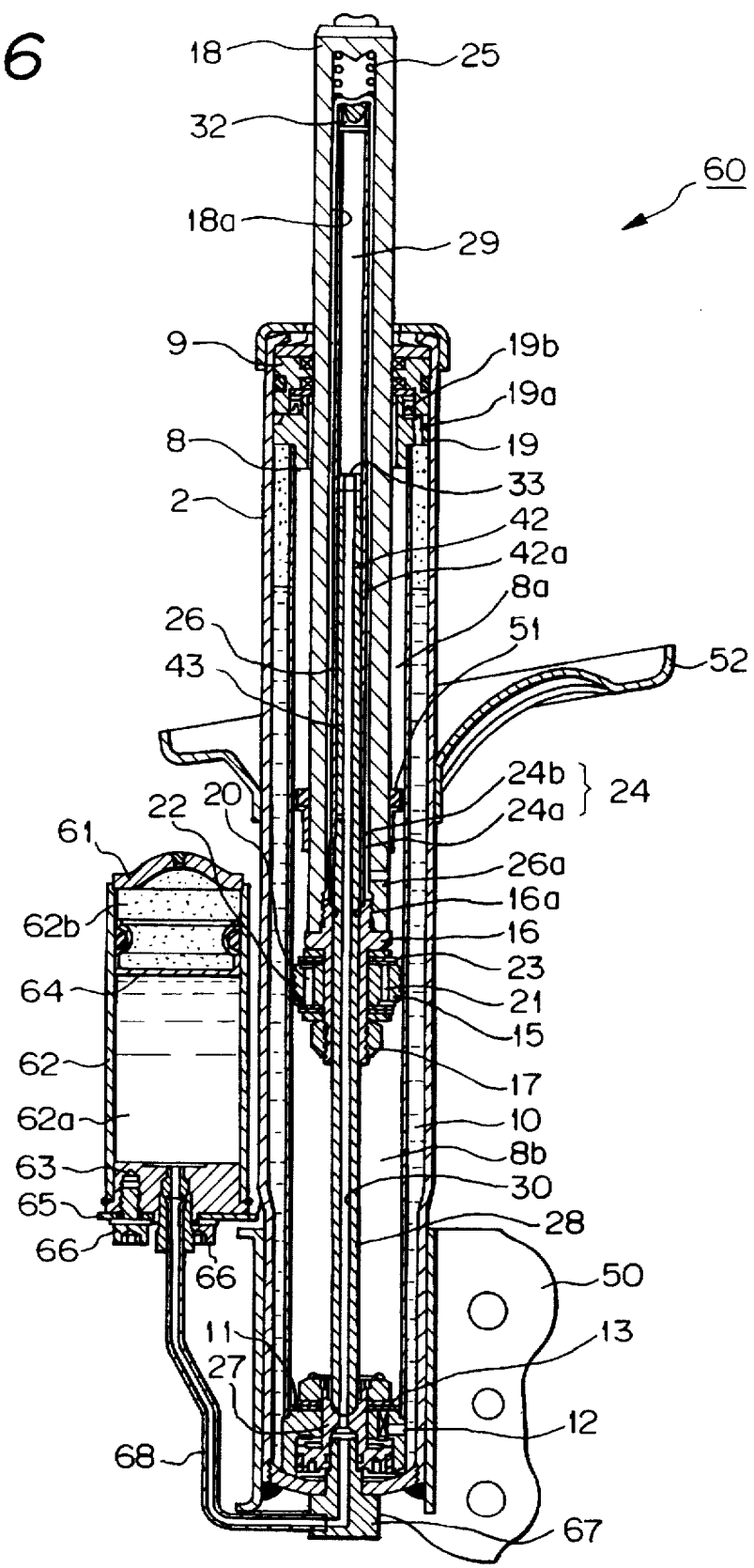
FIG. 6 is a longitudinal section showing a hydraulic shock absorber according to a second embodiment of the present invention.
Figure 7:
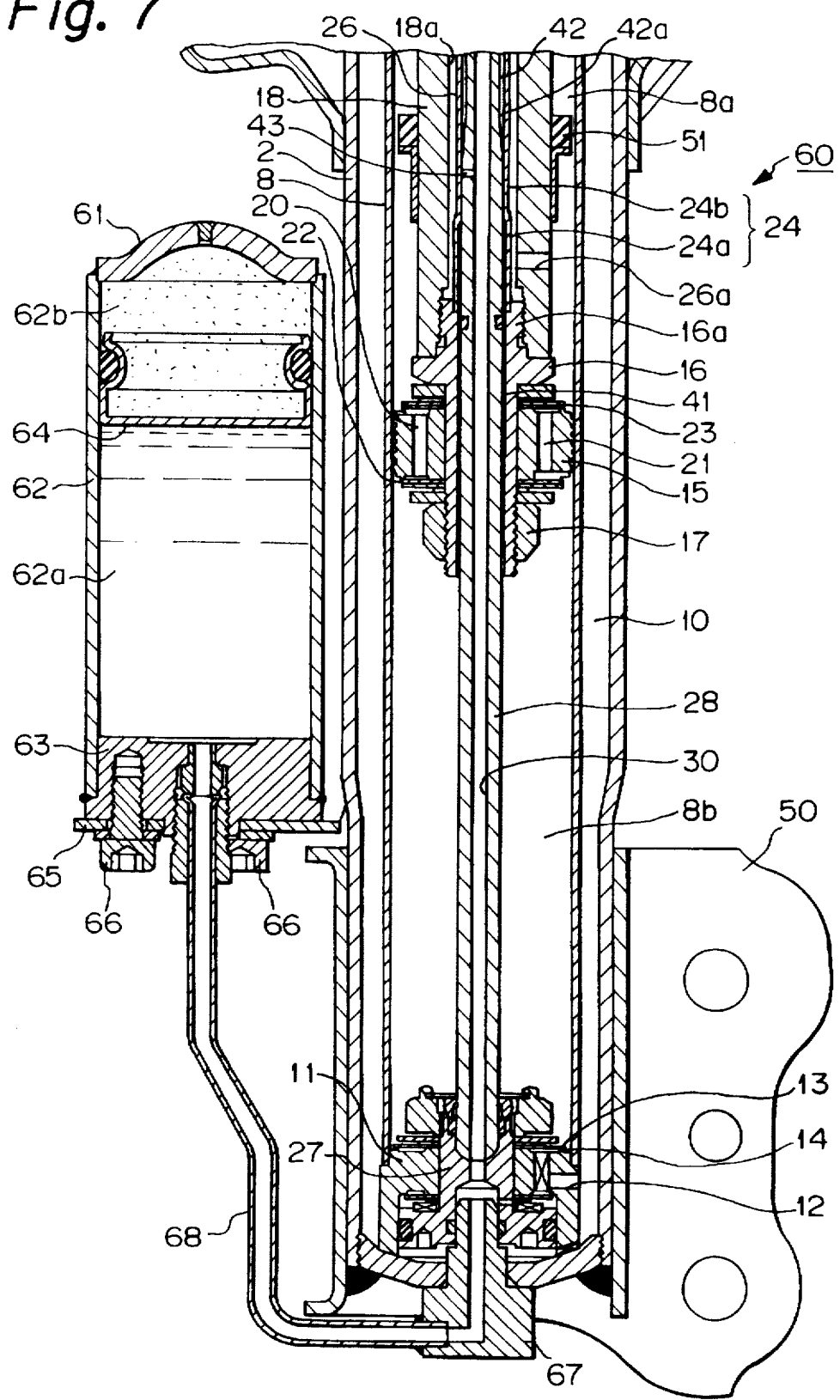
FIG. 7 is an expanded view showing an essential portion of the shock absorber shown in FIG. 6.

Next, the description will be directed to a hydraulic shock absorber according to a second embodiment of the invention with reference to FIGS. 6 and 7. This shock absorber is analogous to the shock absorber of the first embodiment, except for the location of an oil tank for storing the oil for adjusting a vehicle height. Hence, the same components of this embodiment as those of the first embodiment have the same reference numbers, and only unlike components will be described below.

As shown in FIGS. 6 and 7, the shock absorber 60 of the second embodiment has an oil tank 61 located separately out of the case 2 and the base valve 11 located on the bottom of the case. In the oil tank 61, a plug 63 is attached to an opening of a cylindrical tank case 62 having the other end closed. And, a free piston 64 is slidably fitted into the tank case 62. This free piston 64 serves to divide the tank case 62 into an oil chamber 62a located toward the opening and a gas chamber 62b located toward the bottom. The oil chamber 62a contains oil sealed therein. This oil serves to adjust the vehicle height. The gas chamber 62b contains compressed gas (2 to 6 kg/cm$^2$) sealed therein. The oil tank 61 is mounted on the side of the case 2 (the main body of the shock absorber) with a bolt 66. A bracket 65 is located between the tank 61 and the case 2.

A passage member 67 is mounted on the bottom of the case 2 and is fitted to the retainer 27 so that the member 67 is communicated with the oil passage 30 of the pump rod 28. Numeral 68 denotes a pipe, which serves to communicate the passage member 67 with the oil chamber 62a of the oil tank 61. This establishes the communication between the oil passage 30 of the pump rod 28 and the oil chamber 62a of the oil tank 61.

It is omitted in the illustrated shock absorber to show an oil passage for directly communicating the cylinder upper and lower chambers 8a and 8b with each other and a damping force generating mechanism for adjusting an area of the oil passage, which are provided by the piston bolt 16, the nut 17 and the pump rod 28, in the first embodiment.

Like the first embodiment, the shock absorber constructed as noted above operates to repeat the pumping operation and the relief operation with the vibrations of the suspension system when the vehicle is running, for adjustably keeping the vehicle height constant irrespective of amount of the live load on the vehicle. The disk valves 22 and 23 provided in the piston 15 and an orifice (not shown) provided in these valves are used for controlling flow of oil through the extension and the compression passages 20 and 21, thereby generating the damping force.

The shock absorber 60 is constructed so that the oil tank for storing the oil for adjusting a vehicle height is located outside of the case 2 of the main body of the shock absorber. Hence, the reservoir chamber 10 and the oil tank may provide a sufficiently large gas volume. The shock absorber 60 employs the so-called erected structure where the piston rod 18 is projected from the top of the cylinder 8. It may preferably be used as a suspension strut.

The shock absorber as shown in FIGS. 6 and 7 does not include the damping force adjusting mechanism. Like the foregoing first embodiment, however, this shock absorber may provide the oil passage for directly communicating the cylinder upper and lower chambers 8a and 8b and the damping force generating mechanism for adjusting a passage area in the piston bolt 16, the nut 17 and the pump rod 28. The oil passage and the mechanism can be used for adjusting the damping characteristic according to the stroke of the piston rod 18.

As set forth above, in the shock absorbers according to the first and the second embodiments of the invention, the pumping operation caused by extension and retraction of the piston rod is executed to boost the pressure inside the cylinder for extending the piston rod. When the piston rod is extended to the first predetermined location, the first passage means serves to release the pumping operation. When the piston is extended to the second predetermined location, the second passage means serves to relieve the oil pressure inside the cylinder to the oil tank so that the piston rod is contracted. Hence, by extending and retracting the piston rod, the extended length of the piston rod is automatically adjusted between the first extended location and the second predetermined location. As a result, the use of the vibrations of the suspension system caused when the vehicle is running makes it possible to adjustably keep the height of the vehicle constant irrespective of the live load on the vehicle.

The oil for adjusting the vehicle height is stored in the oil tank located on the lower portion of the cylinder or separately from the cylinder itself. Hence, the reservoir chamber and the oil tank can provide a sufficient large gas volume. This makes it possible to keep the riding comfortability excellent independently of the amount of the live load on the vehicle. The shock absorber according to the present invention employs the so-called erected structure where the piston rod is projected out from the top of the cylinder. This structure is preferable as a suspension strut.

When the piston rod is moved relative to the pump rod, by changing the sectional area of the oil passage for communicating the cylinder chambers divided by the piston with each other according to the extension or retraction location, the shock absorber enables the adjustment of the damping force according to the stroke of the piston rod.

Figure 8:
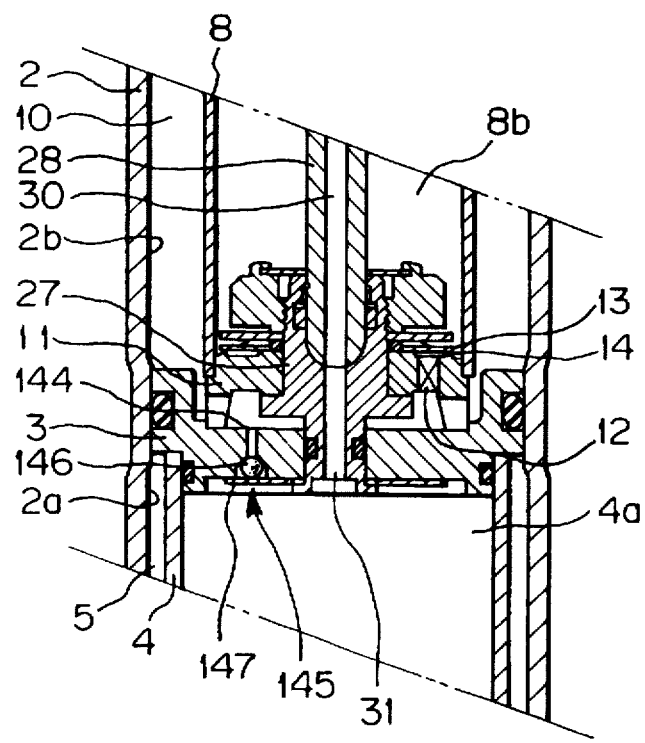
FIG. 8 is an expanded view showing a base valve and a mounting portion of a partition member provided in a hydraulic shock absorber according to a third embodiment of the present invention.

Next, the description will be directed to a hydraulic shock absorber according to a third embodiment of the present invention with reference to FIG. 8. The shock absorber of the third embodiment is analogous to that of the first embodiment except for the provision of a reducing valve 145. Hence, the elements of the third embodiment corresponding to those of the first embodiment have like numerals, and the description about those elements is omitted.

According to the third embodiment, as shown in FIG. 8, the partition member 3 provides an oil passage 144 for communicating the oil chamber 4a of the bottom side chamber 2a with the opening side chamber 2b (the cylinder 8 with the reservoir chamber 10). The oil passage 144 is provided with a reducing valve 145 that, when the oil pressure inside the opening side chamber 2b reaches the predetermined pressure, is opened for relieving the oil of the opening side chamber 2b into the oil chamber 4a. The reducing valve 145 is formed so as to have an enlarged portion on the side of the oil chamber 4a of the oil passage 144. The enlarged portion serves as a valve seat. A check ball 146 is inserted into the enlarged portion. The check ball 146 is pressed against the valve seat at a predetermined load by a disk valve 147 mounted on the end facing the oil chamber 4a of the partition member 3. Normally, the check valve 146 serves to close the oil passage 144. When the pressure difference between the opening side chamber 2b and the oil chamber 4a reaches the predetermined value, the disk valve 147 is flexed so that the valve 147 is opened. As a result, the oil is relieved from the opening side chamber 2b to the oil chamber 4a.

The pumping operation as described with respect to the first embodiment may abruptly raise the pressure inside the opening side chamber 2b. When the pressure reaches a predetermined value, the reducing valve 145 of the partition member 3 is opened so that the oil inside the opening side chamber 2b is passed through the oil passage 144 and then is relieved to the oil chamber 4a. This relief serves to prevent excessive rise of the pressure inside the operation chamber. When the live load is so large that the pumping increases the pressure inside the cylinder 8, if the piston rod 18 is contracted by the thrusting reaction from the road surface while the vehicle is running, the reducing valve 145 is opened so that the oil of the opening side chamber 2b is relieved to the oil chamber 4a. This relief serves to prevent excessive rise of the pressure inside the opening side chamber 2b for reducing the load on the sealing member and each connection between the members of the shock absorber 1 and alleviating the shock on the vehicle given by the thrusting reaction from the road.

Figure 9:
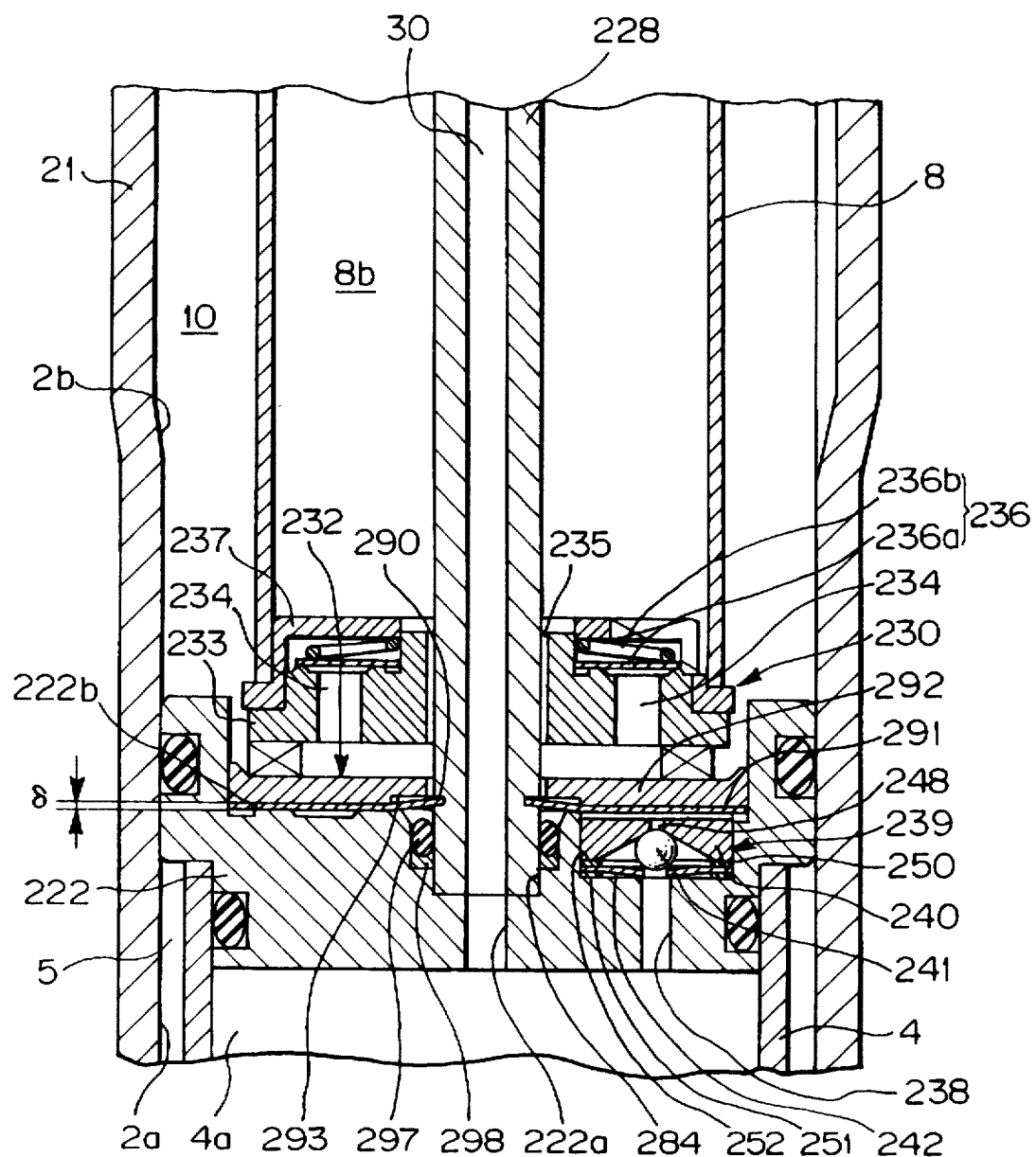
FIG. 9 is a section showing a structure of an essential portion in a hydraulic shock absorber according to a fourth embodiment of the present invention.

Next, the description will be directed to a hydraulic shock absorber according to a fourth embodiment of the present invention with reference to FIGS. 9 to 11. The shock absorber of the fourth embodiment is analogous to that of the first embodiment except for a mechanism of mounting the pump rod with the partition member and provision of the reducing valve in the partition member. Hence, the description about the first embodiment may be applied to the fourth embodiment except for the matters described as below. The same elements of the fourth embodiment as those of the first embodiment have the same numerals.

As shown in FIG. 9, the lower end of the cylinder 8 is butted against a partition member 222 through a connecting means 232 for connecting a base valve 230 and a pump rod 228 (to be described below) with a partition member 222. As is well understood from FIG. 9, the reservoir chamber 10 is communicated with the cylinder 8 through oil passages 234 formed in a main body 233 of the base valve 230 and a slight fitting gap 235 (of about 0.5 mm) between the main body 233 and the pump rod 228. The base valve 230 includes a check valve 236 for allowing flow of oil from the reservoir chamber 10 to the cylinder through the oil passages 234. This check valve 236 is composed of a disk valve 236a and a spring 236b. The disk valve 236a is seated on or separated from the top of the main body 233. One end of the spring 236b is pressed on the bottom of a cup member 237 inserted between the main body 233 and the cylinder 8 so that the spring 236b serves to normally urge the disk valve 236a in the direction of closing the valve.

The partition member 222 provides an oil passage 238 for communicating the cylinder 8 (reservoir chamber 10) with the oil chamber 4a. The oil passage 238 has a reducing valve 239 inserted therein. The reducing valve 239 is composed of a valve seat 240, a ball 241 to be seated on or separated from the valve seat 240, and a valve spring (flat spring) 242. When the pressure difference between the cylinder 8 and the oil chamber 4a reaches a predetermined value, the ball 241 is separated from the valve seat against the force of the valve spring 242. This results in opening the oil passage 238, thereby suppressing excessive rise of the pressure inside the cylinder 8.

As well illustrated in FIG. 9, the pump rod 228 has a base end that is loosely inserted through the main body 233 of the base valve 230 and extended into the partition member 222. Then, the base end is fitted into a recess 284 formed on the partition member 222. The connecting means 232 for connecting the pump rod 228 with the partition member 222 is composed of a ring disk 291 and a ring retainer 292. The ring disk 291 is elastically deformable and the inner periphery of the ring disk 291 is fitted in a peripheral groove 290 formed on the pump rod 228. The ring retainer 292 serves to receive the axial force of the cylinder 8 through the main body 233 of the base valve 230 and press the disk 291 against a supporting surface 222b of the partition member 222.

The base end of the pump rod 228 is inserted in the recess 284 of the partition member 222 so that the base end reaches the bottom of the recess 284. In this fixed state, a step having a predetermined magnitude of 6 is formed between the lower wall of the peripheral groove 290 of the pump rod 228 and the supporting surface 222b of the partition member 222. A stepwise relief 293 is formed on the lower surface of the inner periphery of the retainer 292. The inner peripheral edge of the disk 291 is flexed in the relief 293 when the disk 291 is tightly pressed between the partition member 222 and the retainer 292. That is, the deformation of the disk 291 results in applying the pressure to the pump rod 228 in the direction from the disk 222 to the partition member 291. This pressure provides a predetermined set weight onto the pump rod 228. This predetermined weight is set to have a larger value than a tension applied to the pump rod 228 in the extending stroke of the piston rod 18. Hence, the disk is tightly fitted in the peripheral groove 90 of the pump rod 228 without play.

As shown in FIG. 10, the disk 291 includes plural pawls defined by a center hole 294A having a diameter smaller than that of the pump rod 228, circumferential cutouts 294B that intermittently extend on the outer periphery, and radial cut-outs 294C that connect the circumferential cut-outs 294B with the center hole 294A. The elastic deformation of the pawl 295 brings about the set weight. To mount the disk 291 to the pump rod 228, as shown in FIGS. 11(a) and (b), a thin cap 296 is pre-fitted to the tip of the pump rod 228. As shown in FIG. 11 (a), the cap 296 has a tapered portion 296a at its tip. The tapered portion 296a is used to press the disk 291 upward along it so that the disk 291 is fitted into the peripheral groove 290 of the pump rod 228 as shown in FIG. 11 (b).

After the disk 291 is pre-mounted on the pump rod 228 as mentioned above, the retainer 292 and the base valve 230 are piled on the disk 291. Then, the combination of these elements mounted on the pump rod is placed on the partition member 222. Then, the cylinder and the other elements are assembled to the combination for completing the shock absorber. In the completed shock absorber, the axial force applied to the cylinder 8 serves to press the disk 291 between the partition member 222 and the retainer 292 and apply the set load to the pump rod 228 as noted above. The thickness of the disk 291 is sufficiently thinner than the width of the peripheral groove 290 of the pump rod 228 for easy assembly. In the assembled state of the shock absorber, the set load keeps the disk 291 in the peripheral groove 290 without play. Hence, no noise is generated when the shock absorber is in operation.

The fitting gap 235 between the pump rod 228 and the main body 233 of the base valve 230 allows the pump rod 228 to be radially inclined when the shock absorber is in operation. Inside the recess 284 of the partition member 222, an O ring 297 and a back-up ring 298 are located for sealing the gap between the partition member 222 and the pump rod 228. The O ring 297 may be deformed by a pressure difference between the interior of the cylinder 8 and the oil chamber 4a so that the deformed part of the O ring 297 may be fitted into the gap between the partial member 222 and the pump rod 228. In this case, the O ring 297 may be damaged. The back-up ring 298 serves to prevent damage of the O ring 297 caused in that case, and is made of resin.

As shown in FIG. 9, the reducing valve 239 includes a valve housing 250. It also has annular spacers 251 and 252, a valve spring 242, a check ball 241, and a seat member 240. They are fitted into the valve housing 250. The valve housing 250 is made of a circular recess formed around the oil passage on the end surface facing the opening side chamber 2b of the partition member 222. The valve spring 242 is made of a disk-like elastic member having a circular opening at the center and plural cut-outs radially extended from the opening toward the outer peripheral side. The seat member 240 has a tapered seat surface on which the check ball 241 is seated. An oil path 248 is opened at the center of the seat surface.

In the valve housing 250, the spacer 251, the valve spring 242, the spacer 252, and the check ball 241 are inserted so that they are arranged in this recited order from the bottom. The seat member 240 is put on the check ball 241 and press-fitted in the valve housing. The force of the valve spring 242 serves to press the check ball 241 on the seat surface at a predetermined set load so that the communication between the oil passage 238 and the oil path 248 is cut off. When the pressure difference between the opening side chamber 2b and the oil chamber 4a reaches a predetermined value, the valve spring 242 is flexed so that the check ball 241 travels back from the seat surface, whereby the oil passage 238 is communicated with the oil path 248 through the cut-outs of the valve spring. The communication results in relieving the oil inside of the opening side chamber 2b into the oil chamber 4a. The flexing clearance of the valve spring 242 is provided by the spacer 251 laid between the bottom of the valve housing 250 and the valve spring 242. The initial flex (set load) of the valve spring 242 is changed by the thickness of the spacer 252 laid between the valve spring 242 and the seat member 240 for the purpose of adjusting the opening pressure of the reducing valve 239.

Since the seat member 240 is separate from the partition member 222, the seat surface may be easily formed by sintering or mechanical work. The set load of the valve spring 242 can be easily adjusted by the thickness of the spacer 252 laid between the valve spring 242 and the seat member 240. Hence, by providing spacers having different thicknesses, it is possible to easily change the set opening pressure of the reducing valve 239 and compensate for variations of the opening pressure caused by the dimensional tolerances of the components.

Figure 12:
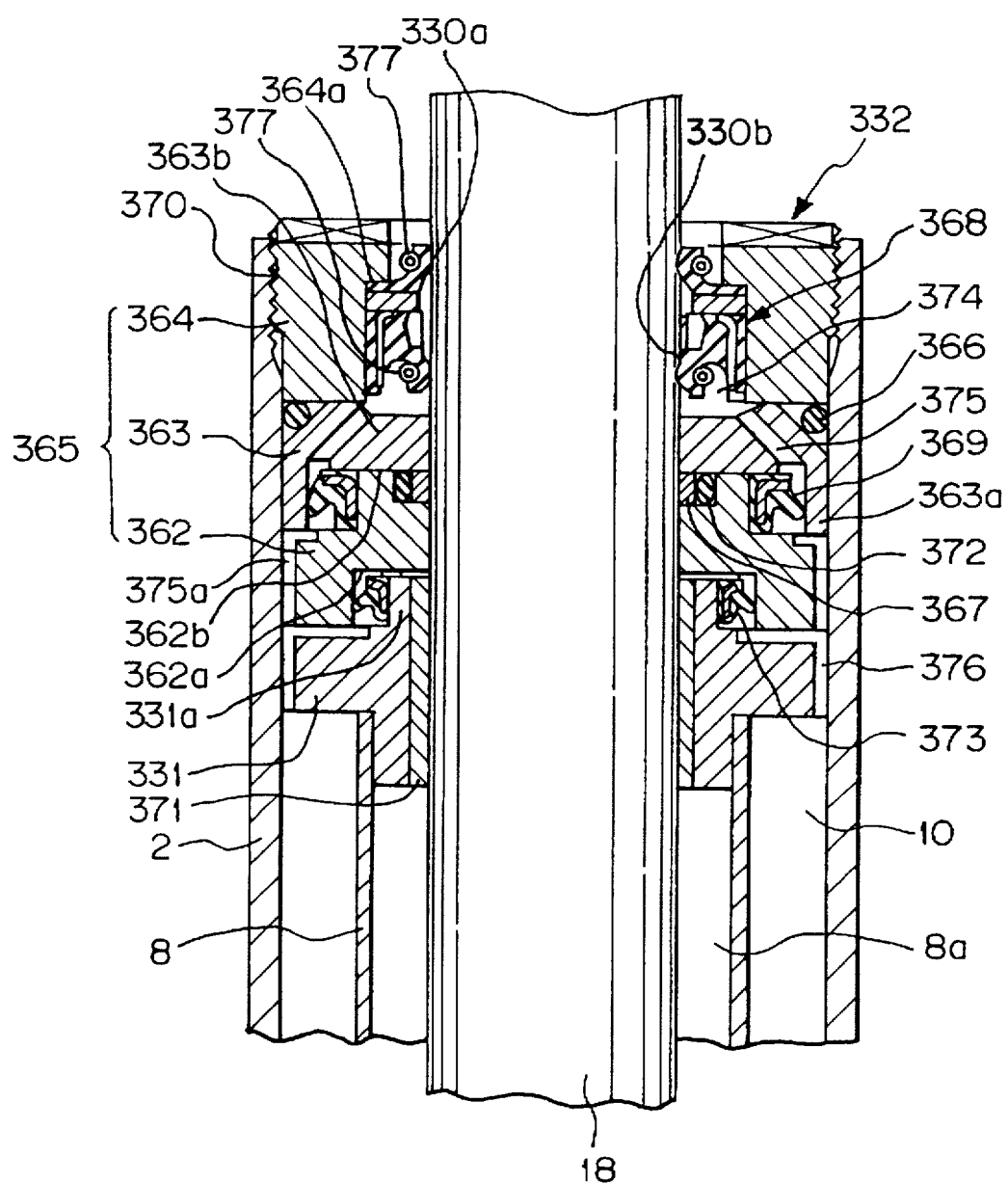
FIG. 12 is a section showing a structure of an essential portion of a hydraulic shock absorber according to a fifth embodiment of the present invention.

Next, the description will be directed to a hydraulic shock absorber according to a fifth embodiment of the present invention with reference to FIG. 12. The shock absorber of the fifth embodiment is substantially analogous to that of the first embodiment except for a rod guide for supporting the upper end of the piston rod 18 and a sealing unit for sealing the piston rod and the case. The description about the first embodiment may apply to the fifth embodiment except for the elements to be described below. The same elements of the fifth embodiment as the first embodiment have the same numerals.

As shown in FIG. 12, a sealing unit 332 is generally constructed to have a sealing block 365 composed of a first to a third rings 362 to 364 piled in sequence from a rod guide 331 to the upper end opening of the case 2, a gas-seal O ring 366 supported on the outer peripheral portion of this sealing block 365, first and second sealing members 367 and 368 for sealing the rod in a "two-stage fashion" on the inner peripheral side of the sealing block 365, and an oil-relief check valve 369 located at the middle of the sealing block 365. These rings composing the sealing block 365 are fastened to the rod guide 331 by tightening the third ring 364 through a screw 370 formed on the opening end of the case 2. A bearing sleeve 371 is fitted to the inner peripheral portion of the rod guide 331. The bearing sleeve 371 serves to slidably guide the piston rod 18.

Of the rings 362 to 364 composing the sealing block 365, the first ring 362 located on the side of the rod guide 331 includes a recess 362a located on the lower inner peripheral portion. The recess 362a receives an annular projection 331a formed on the rod guide 331. The recess 362a is fixed on the rod guide 331 by pressing the tip of the outer diameter portion around the recess 362a against the top surface of the rod guide 331. The first ring 362 includes an annular projection 362b on the center of the top surface. The recess located inside of the annular projection 362b serves as a portion for storing the first sealing member 367 of the rod seal. The outer peripheral surface of the annular projection 362b serves as a fitting surface where the check valve 369 is fitted. The recess located inside of the annular projection 362b has an O ring 372 located on the outside of the first sealing member 367. The O ring 372 serves to press the first sealing member 367 against the piston rod 18. A check valve 373 is fitted to the annular projection 331a of the rod guide 331. The check valve 373 cooperates with the inner peripheral surface of the recess 362a of the first ring 362, which functions as a sealing surface. The check valve 373 serves to prevent invasion of gas from the reservoir chamber 10 into the cylinder upper chamber 8b.

Of the rings 362 to 364 composing the sealing block 365, the second ring 363 located at the middle is cup-like. The second ring 363 is fixed on the first ring 362 by pressing the tip of a cup wall 363a against the top surface of the first ring 362. In the fixed state, a cup bottom 363b serves as a stopper for suppressing axial movement of the first sealing member 367 and the O ring 372. The inner peripheral surface of the cup wall 363a serves as a sealing surface of the oil-relief check valve 369. The cup bottom 363b provides a relief passage 375 extending from an oil reservoir 374 located on the inner diameter side of the third ring 364 to the check valve 369. The relief passage 375 is communicated with the reservoir chamber 10 through a sub relief passage 375a formed on the outer peripheral surface of the first ring 362 and another sub relief passage 376 formed on the outer peripheral surface of the rod guide 331. The upper corner of the second ring 363 is bevelled. The gas-seal O ring 366 is located on the bevelled surface. The third ring 364 serves to prevent the O ring 366 from coming off of the bevelled surface. The second sealing member 368 which serves as a rod seal is fitted on the inner surface of the third ring 364. The third ring 364 has a step 364a formed inside thereof. The step 364a serves to prevent the second sealing member 368 from coming off of the inner surface of the ring 364.

The first sealing member (first-stage sealing member) 367 which serves as a rod seal is composed of a ring made of polytetrafluorethylene. The second sealing member (second-stage sealing member) 368 is composed of an oil seal made of rubber. The second sealing member 368 includes upper and lower lips 330a and 330b and springs 377. The two lips 330a come into contact with the piston rod 18. The springs 377 serve to forcibly press the lips 330a and 330b against the piston rod 18.

In the extension stroke and the pumping operation of the piston rod 18, the oil pressure inside the cylinder upper chamber 8a is raised, so it is likely that the oil leaks out of the first sealing member serving as a rod seal. This leakage of the oil is prevented by the first sealing member 367 at the first stage (on the high pressure side). If, however, the piston rod 18 is relatively rapidly extended or the pumping operation is repeated frequently, the pressure inside the cylinder upper chamber 8a is raised so that the oil slightly leaks out of the first sealing member 367 (made of polytetrafluoroethylene and excellent in sliding characteristics). The leaked oil is prevented from leaking outside by the second-stage (low-pressure side) second sealing member 368 composed of an oil seal made of rubber and thus is stored in an oil reservoir 374. As the leakage is gradually made larger, the oil pressure inside of the oil reservoir 374 is raised to a predetermined value, until the check valve 369 located in the relief passage 375 is opened. Then, the oil stored in the oil reservoir 374 flows into the reservoir chamber 10 through the relief passage 375 and the sub relief passages 375a and 376. Hence, the flow of the oil to the outside is completely prevented. Besides, the oil relief function serves to prevent the rise of the oil pressure inside the oil reservoir 374 beyond a predetermined pressure. It enables permanently maintaining the sealing function of the oil seal (second sealing member). According to the fifth embodiment, in particular, the springs 377 serve to forcibly press the back surfaces of the lips 330a and 330b of the oil seal 368 against the rod guide 18. Hence, if a heavy lateral weight is added to the shock absorber, the oil seal 368 follows the lateral shift of the elements caused by the lateral load, so that the oil seal 368 keeps its sealing function.

Further, according to the fifth embodiment, the second-stage sealing member (second sealing member) 368 is made of rubber. However, the present invention does not limit the material of the member. Alternatively, the member may be made of plastic.

As set forth above, in the shock absorber according to the fifth embodiment, a sliding characteristic of the piston rod is brought about by the first-stage sealing member formed of polytetrafluorethylene (fluorine plastic). The function of preventing leakage of the oil to the outside is assured by the second-stage sealing member made of an oil seal. Further, if the pressure between the first-stage sealing member and the second-stage one is made larger with increase of the oil leaked out of the first-stage sealing member, the check valve located in the relief passage is opened so that the oil is relieved to the reservoir chamber. The shock absorber therefore enables to positively prevent the leakage of the oil to the outside of the cylinder.

Moreover, the shock absorber provides the oil reservoir between the first-stage sealing member and the second-stage one so that the relief passage is opened to the oil reservoir. Hence, by temporarily storing the oil in the reservoir, the operating times of the check valve are reduced to as few as possible, and the life of the check valve is prolonged.

In all of the foregoing embodiments, the reservoir chamber 10 contains high-pressure gas (15 to 35 Kg/cm$^2$). The gas chamber 4b of the oil tank contains compressed gas (2 to 6 Kg/cm$^2$). The pressure is established there for canceling the resistance caused by the friction working on a barrier (free piston 7) of the oil tank.

The base valve 11 (230) illustrated in all the drawings provides the oil passage for communicating the interior of the cylinder with the reservoir chamber and the valve like the check valve. If an orifice is used instead of the oil passage, no valve is required. In addition, this oil passage (orifice) may be provided on the cylinder side wall, for example.

The shock absorber according to the prior art includes the oil tank and the gas chamber on the outermost peripheral portion of the shock absorber body. The gas chamber contains gas sealed on the outer peripheral side of the gas chamber. Hence, the shock absorber provides a lower efficiency in dissipating heat generated in the cylinder by the action of the piston. The shock absorbers according to the foregoing embodiments provide a higher efficiency in dissipating heat because the oil fills the portion in the reservoir surrounding the cylinder portion where the piston moves. This is because, in general, liquid has a higher thermal conductivity than gas.

What is claimed is:

1. A hydraulic shock absorber comprising:

a cylinder having an interior containing oil sealed therein;

a case located around said cylinder such that a reservoir chamber is defined between said cylinder and said case;

a piston slidably fitted in said cylinder dividing the interior of said cylinder into two chambers;

a guide member closing one end of said cylinder and said case;

a piston rod having a hollow portion, one end connected to said piston and another end that extends outside of said cylinder and said case through said guide member;

an oil passage between said reservoir chamber and the interior of said cylinder for allowing communication of oil there between;

a base member closing the other end of said cylinder and said case;

a pump tube located in the hollow portion of said piston rod;

a pump rod having one end connected to said base member and an other end extending into said piston, said pump rod being slidably fitted in said pump tube so as to form a pump chamber in said pump tube;

a first pump passage extending in said pump rod from one end thereof to the other;

a cylindrical oil tank connected to one end of said first pump passage, said cylindrical oil tank comprising a partition dividing said cylindrical oil tank into an oil chamber storing oil therein and a gas chamber containing gas sealed therein;

a first check valve located in said first pump passage for communicating said oil chamber of said cylindrical oil tank with said pump chamber and allowing only the flow of oil from said oil chamber to said pump chamber;

a second pump passage located in said piston rod for communicating said pump chamber with the interior of said cylinder;

a second check valve for allowing only the flow of oil from said pump chamber through said second pump passage to the interior of said cylinder;

first means for directly communicating said pump chamber with the interior of said cylinder when said piston rod is extended relative to said cylinder to a first predetermined location such that said pump tube and said pump rod are at a predetermined relative location, said first means being located between said pump tube and said pump rod; and second means for communicating the interior of said cylinder with said first pump passage when said piston rod is extended to a second predetermined position.

2. A hydraulic shock absorber as claimed in claim 1, wherein said two chambers of the interior of said cylinder have an oil passage there between for communicating said two chambers with each other, said oil passage being located between said piston and said pump rod, and wherein said pump rod has a sectional area that varies along its length such that the sectional area of said oil passage changes according to the axial location of said piston relative to said pump rod.

3. The hydraulic shock absorber of claim 2, wherein said guide member has an oil passage for communicating the interior of said cylinder with said reservoir chamber, said oil passage having a check valve therein so as to allow only the flow of oil from the interior of said cylinder to said reservoir chamber.

4. The hydraulic shock absorber of claim 3, wherein said reservoir chamber has compressed gas sealed therein.

5. The hydraulic shock absorber of claim 1, wherein said guide member has an oil passage for communicating the interior of said cylinder with said reservoir chamber, said oil passage having a check valve therein so as to allow only the flow of oil from the interior of said cylinder to said reservoir chamber.

6. The hydraulic shock absorber of claim 5, wherein said reservoir chamber has compressed gas sealed therein.

7. The hydraulic shock absorber of claim 1, wherein said cylindrical oil tank is integrally formed with said case by an extension of one end of said case, and wherein said cylindrical oil tank is located coaxially with and in series with said cylinder.

8. The hydraulic shock absorber of claim 1, wherein said cylindrical oil tank is located outside of said case, and wherein the one end of said pump rod is fluidly connected to said oil chamber of said cylindrical oil tank by a connection pipe.

9. The hydraulic shock absorber of claim 1, wherein said base member comprises a passage for directly communicating the interior of said cylinder with said oil chamber of said cylindrical oil tank, and wherein said passage of said base member comprises a reducing valve for relieving pressure inside said cylinder to said oil chamber of said cylindrical oil tank when the pressure inside said cylinder is equal to or higher than a predetermined pressure.

10. The hydraulic shock absorber of claim 1, wherein said pump rod is connected with said base member by a connecting arrangement that includes an elastically deformable ring-like disk having an inner peripheral portion fitted in a peripheral groove in said pump rod and a retainer for pressing said disk against said base member with an axial force from said cylinder such that the inner peripheral portion of said disk is flexed so as to cause a pump rod pushing force on said pump rod in a direction toward said base member.

11. A hydraulic shock absorber comprising:

a cylinder having an interior containing oil sealed therein;

a case located around said cylinder such that a reservoir chamber is defined between said cylinder and said case;

a piston slidably fitted in said cylinder dividing the interior of said cylinder into two chambers;

a guide member closing one end of said cylinder and said case;

a piston rod having a hollow portion, one end connected to said piston and another end that extends outside of said cylinder and said case through said guide member;

a first oil passage extending between said reservoir chamber and the interior of said cylinder;

a base member closing the other end of said cylinder and said case;

a pump tube located in the hollow portion of said piston rod;

a pump rod having one end connected to said base member and an other end extending into said piston, said pump rod being slidably fitted in said pump tube and defining a pump chamber in said pump tube;

a first pump passage extending in said pump rod from one end thereof to the other;

a cylindrical oil tank connected to one end of said first pump passage, said cylindrical oil tank comprising a partition dividing said cylindrical oil tank into an oil chamber storing oil therein and a gas chamber containing gas sealed therein;

a first check valve located in said first pump passage between said oil chamber of said cylindrical oil tank and said pump chamber and allowing only the flow of oil from said oil chamber to said pump chamber;

a second pump passage located in said piston rod for communicating said pump chamber with the interior of said cylinder;

a second check valve positioned so as to allow the flow of oil only from said pump chamber, through said second pump passage, to the interior of said cylinder;

a second oil passage located between said pump tube and and said pump rod directly communicating said pump chamber with the interior of said cylinder when said piston rod is extended relative to said cylinder to a first predetermined position such that said pump tube and said pump rod are at a predetermined relative location, said second oil passage being closed when said piston rod is retracted relative to said cylinder from said first predetermined position;

a third oil passage communicating the interior of said cylinder with said first pump passage when said piston rod is extended to a second predetermined position, said third oil passage being closed when said piston rod is retracted from said second predetermined position.

12. A hydraulic shock absorber as claimed in claim 11, wherein said two chambers of the interior of said cylinder have a fourth oil passage there between for communicating said two chambers with each other, said oil passage being located between said piston and said pump rod, and wherein said pump rod has a sectional area that varies along its length such that the sectional area of said oil passage changes according to the axial location of said piston relative to said pump rod.

13. The hydraulic shock absorber of claim 12, wherein said guide member has an oil passage for communicating the interior of said cylinder with said reservoir chamber, said oil passage having a check valve therein so as to allow only the flow of oil from the interior of said cylinder to said reservoir chamber.

14. The hydraulic shock absorber of claim 13, wherein said reservoir chamber has compressed gas sealed therein.

15. The hydraulic shock absorber of claim 11, wherein said guide member has an oil passage for communicating the interior of said cylinder with said reservoir chamber, said oil passage having a check valve therein so as to allow only the flow of oil from the interior of said cylinder to said reservoir chamber.

16. The hydraulic shock absorber of claim 15, wherein said reservoir chamber has compressed gas sealed therein.

17. The hydraulic shock absorber of claim 11, wherein said cylindrical oil tank is integrally formed with said case by an extension of one end of said case, and wherein said cylindrical oil tank is located coaxially with and in series with said cylinder.

18. The hydraulic shock absorber of claim 11, wherein said cylindrical oil tank is located outside of said case, and wherein the one end of said pump rod is fluidly connected to said oil chamber of said cylindrical oil tank by a connection pipe.

19. The hydraulic shock absorber of claim 11, wherein said base member comprises a passage for directly communicating the interior of said cylinder with said oil chamber of said cylindrical oil tank, and wherein said passage of said base member comprises a reducing valve for relieving pressure inside said cylinder to said oil chamber of said cylindrical oil tank when the pressure inside said cylinder is equal to or higher than a predetermined pressure.

20. The hydraulic shock absorber of claim 11, wherein said pump rod is connected with said base member by a connecting arrangement that includes an elastically deformable ring-like disk having an inner peripheral portion fitted in a peripheral groove in said pump rod and a retainer for pressing said disk against said base member with an axial force from said cylinder such that the inner peripheral portion of said disk is flexed so as to cause a pump rod pushing force on said pump rod in a direction toward said base member.

* * * * *

UNITED STATES PATENT AND TRADEMARK OFFICE
CERTIFICATE OF CORRECTION

PATENT NO. : 5,797,594
DATED : August 25, 1998
INVENTOR(S) : Chigaya SEKINE et al.

It is certified that error appears in the above-indentified patent and that said Letters Patent is hereby corrected as shown below:

On the third line of the Foreign Application Priority Data, please change "8-055265" to --8-052265--.

Signed and Sealed this

Twenty-third Day of February, 1999

Attest:

Q. TODD DICKINSON

*Attesting Officer*  *Acting Commissioner of Patents and Trademarks*